(12) United States Patent
Kim

(10) Patent No.: US 9,214,875 B2
(45) Date of Patent: Dec. 15, 2015

(54) MULTILEVEL INVERTER

(71) Applicant: LSIS CO., LTD., Anyang-si, Gyeonggi-do (KR)

(72) Inventor: Kyung Sue Kim, Bucheon-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/310,977

(22) Filed: Jun. 20, 2014

(65) Prior Publication Data

US 2015/0009731 A1 Jan. 8, 2015

(30) Foreign Application Priority Data

Jul. 3, 2013 (KR) .................. 10-2013-0077689

(51) Int. Cl.
*H02M 3/18* (2006.01)
*H02M 7/49* (2007.01)

(52) U.S. Cl.
CPC ...................... *H02M 7/49* (2013.01)

(58) Field of Classification Search
CPC .............................. H02M 5/10; H02M 7/49
USPC ........... 363/13, 17, 34, 37, 39, 44, 55, 58, 59, 363/60, 67, 84, 132
See application file for complete search history.

(56) References Cited

U.S. PATENT DOCUMENTS

| | | |
|---|---|---|
| 5,625,545 A | 4/1997 | Hammond |
| 6,236,580 B1 | 5/2001 | Aiello et al. |
| 2010/0023896 A1 | 1/2010 | Rastogi et al. |
| 2010/0072824 A1 | 3/2010 | Abolhassani et al. |
| 2010/0213921 A1 | 8/2010 | Abolhassani et al. |
| 2010/0328848 A1* | 12/2010 | Ledezma et al. ............ 361/603 |
| 2013/0107588 A1* | 5/2013 | Katayama et al. ............ 363/37 |

FOREIGN PATENT DOCUMENTS

JP         2008295149          12/2008

OTHER PUBLICATIONS

European Patent Office Application Serial No. 14173438.4, Search Report dated Feb. 18, 2015, 5 pages.
Japan Patent Office Application Serial No. 2014-136934, Office Action dated Jul. 17, 2015, 4 pages.

* cited by examiner

*Primary Examiner* — Adolf Berhane
*Assistant Examiner* — Afework Demisse
(74) *Attorney, Agent, or Firm* — Lee, Hong, Degerman, Kang & Waimey

(57) ABSTRACT

The present disclosure proposes an input power of each unit power cell of a cascaded H-bridge inverter that is mutually insulated. To this end, the present disclosure includes a phase shift transformer configured to output a voltage of predetermined phase by receiving an AC input power having a fixed frequency, and a plurality of unit power cells serially-connected configured to output a voltage having a predetermined phase by receiving a voltage provided by the phase shift transformer, wherein the phase shift transformer is configured to include the number of phase shifts corresponding to the number of the plurality of unit power cells.

5 Claims, 4 Drawing Sheets

MULTILEVEL INVERTER

Pursuant to 35 U.S.C. §119(a), this application claims the benefit of earlier filing date and right of priority to Korean Patent Application No. 10-2013-0077689, filed on Jul. 3, 2013, the contents of which are hereby incorporated by reference herein in its entirety.

BACKGROUND OF THE DISCLOSURE

1. Field

The teachings in accordance with the exemplary embodiments of this present disclosure generally relate to an inverter, and more particularly to a multilevel medium voltage inverter.

2. Background

In general, a multilevel medium voltage inverter is an inverter having an input power whose rms (root mean square) value is over 600V for a line-to-line voltage, and has several stages in output phase voltage. The multilevel medium voltage inverter is generally used to drive an industrial load of large inertia ranging from several kW to several MW capacities of, for a non-limiting example, fans, pumps, compressors, tractions, hoists and conveyors.

One form of multilevel inverter is a Cascaded H-Bridge (CHB) inverter architecture, which employs multiple series-connected H-Bridge inverters for driving each motor winding phase, or a cascaded NCP (Neutral Point Clamped) inverter transformed from the CHB inverter. The recently used NCP inverter is advantageous over a conventional series-connected CHB inverter due to smaller size. The multilevel inverter widely used in various fields requires a higher efficiency and a topology of smaller number of elements.

The Cascaded H-Bridge (CHB) inverter is the most common medium voltage inverter, where low voltage single phase inverters are combined to output a high voltage, and entire configuration includes an input end multi-winding transformer, unit power cells and a controller. The CHB inverter is used as a medium voltage by combining unit power cells including several low voltage single phase inverters, where unit power cells are serially connected for each phase, an output of each unit power cell is controlled to output a high voltage 3-phase voltage and power. An input power of each unit power cell of the CHB inverter must be mutually insulated, but an efficient mutual insulation of the input powers is not easy.

SUMMARY OF THE DISCLOSURE

The present disclosure is to provide a cascaded H-bridge inverter configured to efficiently insulate an input power of each unit power cell.

In one general aspect of the present disclosure, there is provided a multilevel inverter, the multilevel inverter comprising:
a phase shift transformer configured to output a voltage of predetermined phase by receiving an AC input power having a fixed frequency; and
a plurality of unit power cells serially-connected configured to output a voltage having a predetermined phase by receiving a voltage provided by the phase shift transformer;
wherein the phase shift transformer is configured to include the number of phase shifts corresponding to the number of the plurality of unit power cells.

Preferably, but not necessarily, the unit power cell may be configured such that three unit power cells for each phase are serially connected for 3-phase output, the phase shift transformer including nine phase shifts, and each phase value being of a difference of 60°/9.

Preferably, but not necessarily, each of the phase value may be $-27°, -20°, -13°, -7°, 0°, 7°, 13°, 20°$ and $27°$.

Preferably, but not necessarily, an output voltage of the unit power cell may be configured to provide one of 3,000V, 3,300V and 4,150V.

Preferably, but not necessarily, the unit power cell may be arranged in the form of a cascaded H-bridge medium voltage multilevel inverter.

Advantageous Effects of the Disclosure

The multi-level inverter system according to the present disclosure thus described has an advantageous effect in that a phase shift degree of a multi-winding transformer is changed from the number of entire unit power cells to the number of unit power cells for each phase to allow being applied to 3,000V, 3,300V and 4,150V cascaded H-bridge medium voltage multilevel inverters, whereby a conventional 3~4% input current THD (Total Harmonic Distortion) character can be reduced to a 1~2% input current THD character.

DETAILED DESCRIPTION OF THE DISCLOSURE

The following embodiments described herein are intended to explain modes known of practicing the disclosure and to easily enable others skilled in the art to utilize the disclosure using the accompanied drawings. Now, the present invention will be described in detail with reference to the accompanying drawings.

The CHB inverter is used as a medium voltage by combining unit power cells including several low voltage single phase inverters, where unit power cells are serially connected for each phase, an output of each unit power cell is controlled to output a high voltage 3-phase voltage and power. An input power of each unit power cell of the CHB inverter must be mutually insulated, and each transformer winding must be used. The present disclosure can reduce the THD (Total Harmonic Distortion) of an input terminal current by applying a phase shift type to the transformer winding. The THD relates to how many frequency components except the fundamental wave are included in an output current component.

The present disclosure proposes a technology to reduce a conventional 3~4% input current THD character to a 1~2% input current THD character when a multi-winding transformer of less than 3-serial per phase in a cascaded H-bridge inverter is used.

Figure 1:
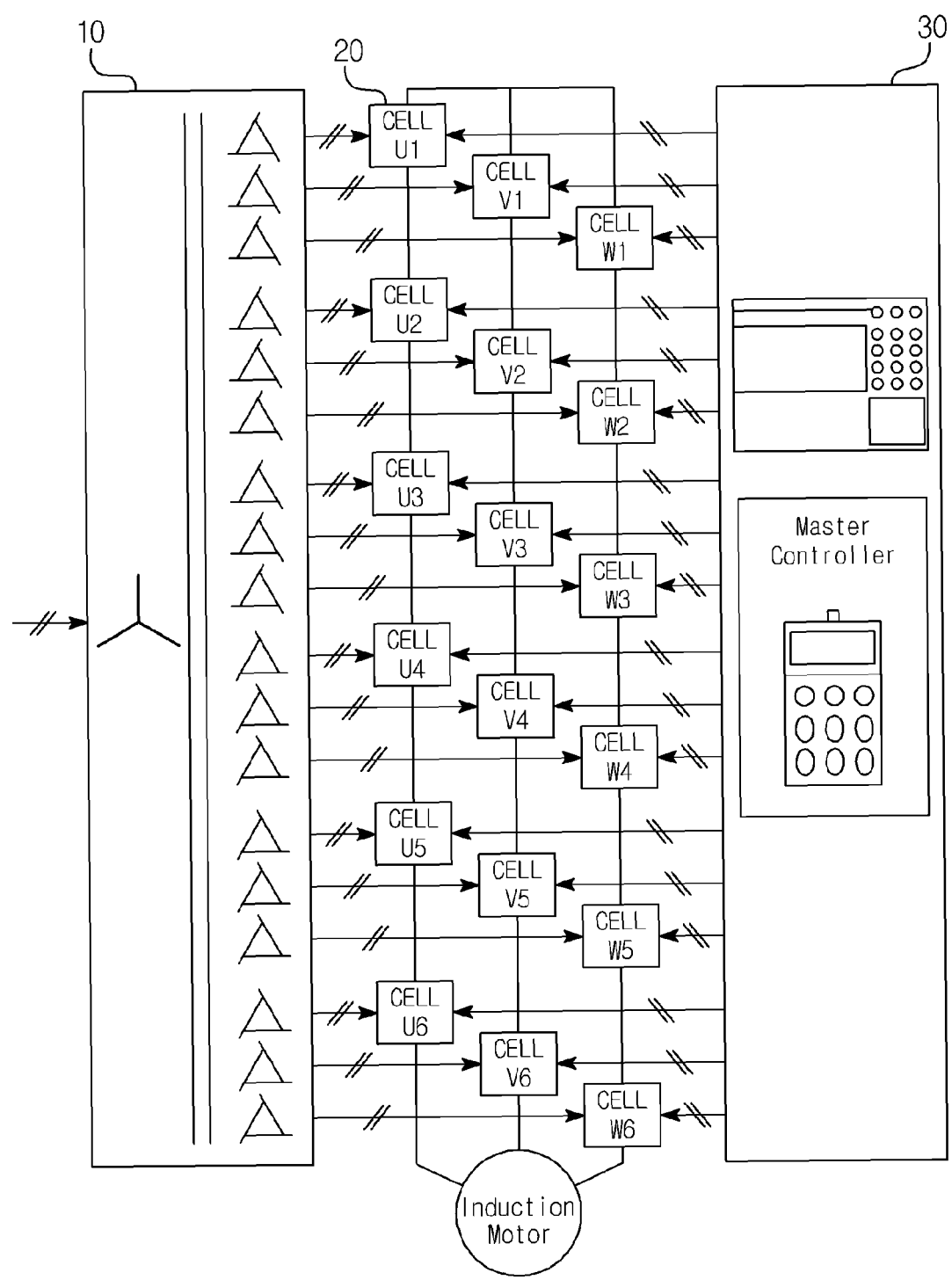
FIG. 1 is a block diagram illustrating an inverter system according to the present disclosure.
Figure 2:
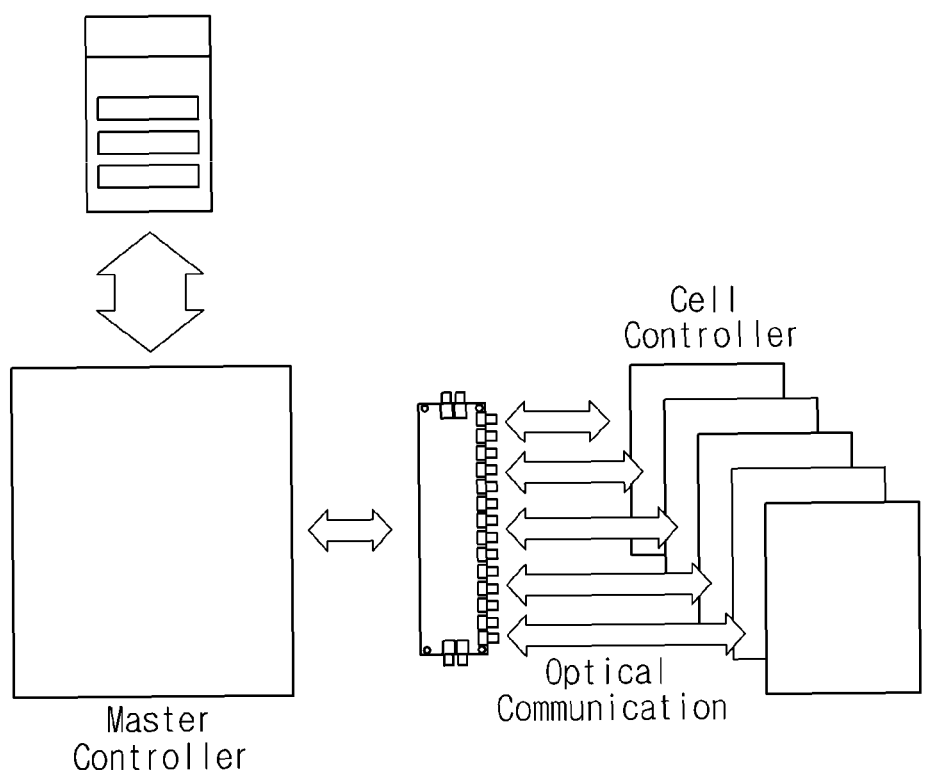
FIG. 2 is a schematic view illustrating a board embodying the inverter system of FIG. 1.

FIG. 1 is a block diagram illustrating an inverter system according to the present disclosure, and FIG. 2 is a schematic view illustrating a board embodying the inverter system of FIG. 1.

Referring to FIG. 1, an H-bridge multilevel inverter includes a phase transformer (10), unit power cells (20), and a master controller (30) configured to exchange information with the unit power cells. The phase transformer (10) serves to supply a voltage of necessary phase to a DC link unit of independently separated unit power cell.

The unit power cells (U1/U2/U3/U4/U5/U6) forming each row is configured to output a signal of one phase, and are serially connected. Furthermore, a controller (not shown) included in each unit power cell exchanges data with the master controller (30) via an optical cable.

FIG. 2 is a system configuration of a multilevel inverter, where a controller of the system largely includes a master controller, and respective unit power cell controllers. The master controller and the unit power cell controllers exchange signals via optical communication.

The master controller (30) performs main acceleration/deceleration control including instantaneous interruption, re-start, speed search, emergent stop, auto energy save, self diagnosis function, S/L, auto tuning, frequency limit, and stall prevention. An operation basic format for unit power cell including output voltage command, a synchronous signal is transmitted from the master controller (30) to a unit power cell controller via optical communication, and alternatively, information including an over-voltage, an under-voltage, an arm short-circuit, a ground, a fuse open, a heat sink overheat, an abnormal H/W, open phase of output in unit power cell, and input open phase is transmitted from the unit power cell controller to the master controller (30).

Figure 3:
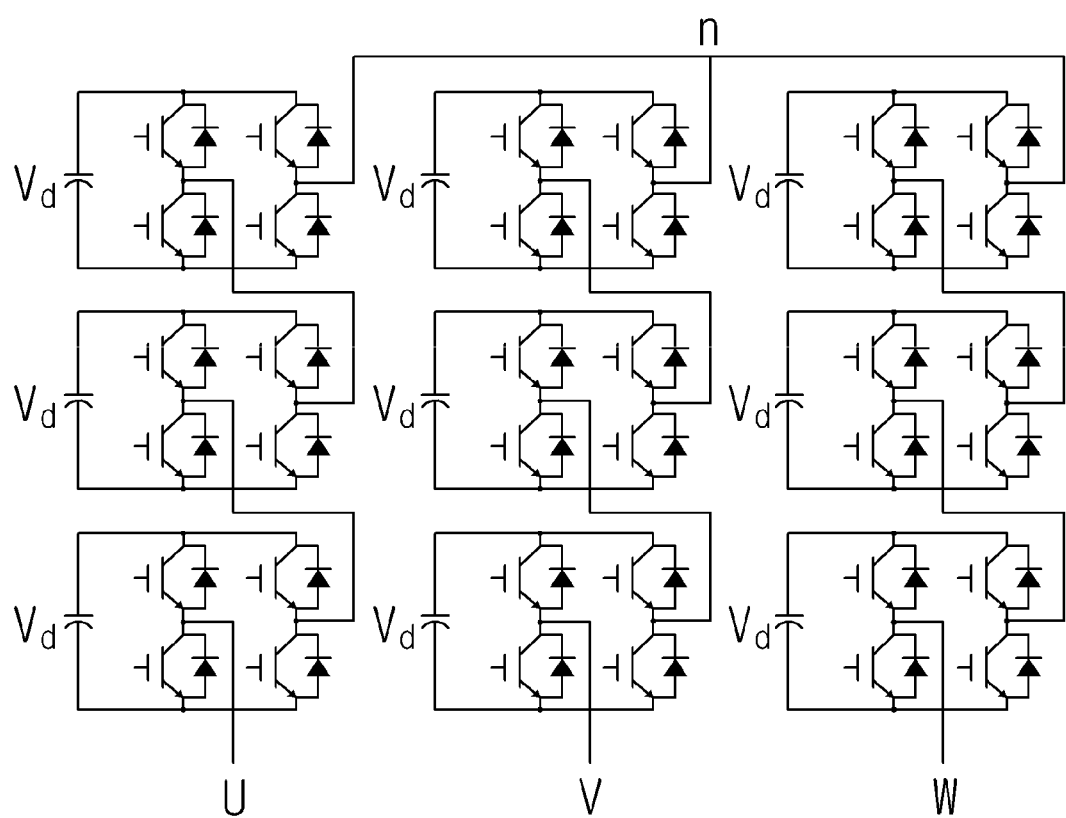
FIG. 3 is a circuit diagram illustrating unit power cells of the inverter system of FIG. 1.
Figure 4:
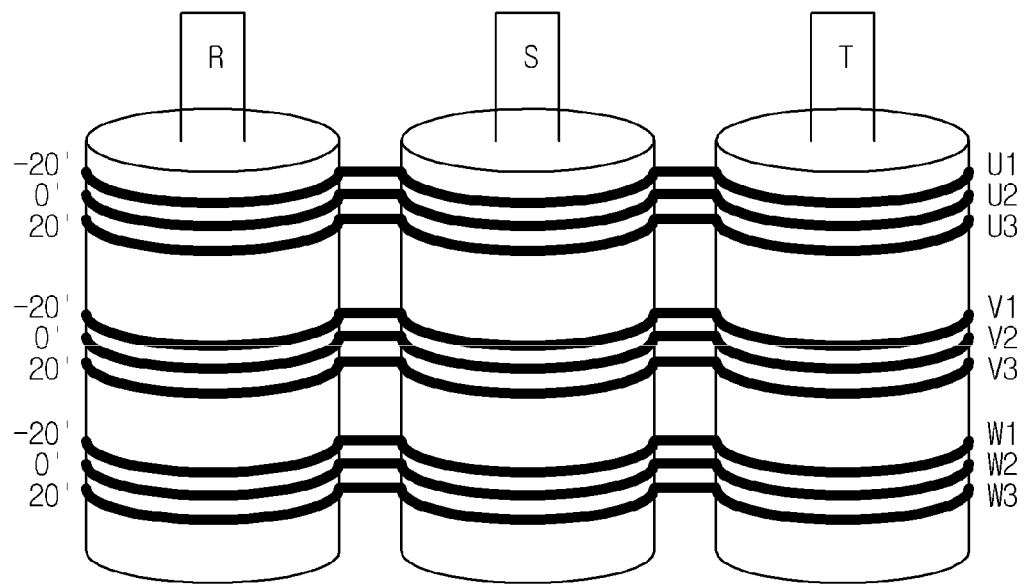
FIG. 4 is a schematic view illustrating a transformer of FIG. 1.

FIG. 3 is a circuit diagram of unit power cells of the multilevel inverter system of FIG. 1, and FIG. 4 is a schematic view illustrating a transformer of FIG. 1.

Referring to FIGS. 1 to 4, the master controller receives voltage from each unit power cell, and in turn provides voltage reference information to the unit power cell. Each unit power cell generates an output voltage by receiving a DC-Link voltage, and applies the output voltage to a motor which is a load. Frequency of voltage outputted by the unit power cell is changed to be used for controlling torque and speed of the motor.

The input current THD of the cascaded H-bridge medium voltage inverter is influenced by the number of unit power cells in each layer, and in case of 6-serial multi-winding transformer having a 36-pulse rectifying characteristic, the input current THD has a 1~2% THD and can be stably used. However, the 3-serial multi-winding transformer shows a 18-pulse rectifying characteristic with a 4~5% THD, and is difficult to be used in a power generator that requires a high input current THD requirement base. A multi-winding transformer used in the conventional cascaded H-bridge medium voltage inverter has the number of phase shifts corresponding to that of unit power cells for each phase.

The present disclosure proposes a multi-winding transformer that has the number of phase shifts corresponding to the number of entire unit power cells. For example, although the number of phase shifts for the 3-serial multi-winding transformer is three whose phase values are 60°/3 of −20°, 0°, 20°, the present disclosure has the number of phase shifts of 9 whose phase values are, in order to show mutually different 60°/9 difference, respectively −27°, −20°, −13°, −7°, 0°, 7°, 13°, 20°, 27° whereby a rectifying characteristic of a total of 54 pulses is shown to resultantly allow a THD characteristic of an input current have a 1~2% value.

Figure 5:
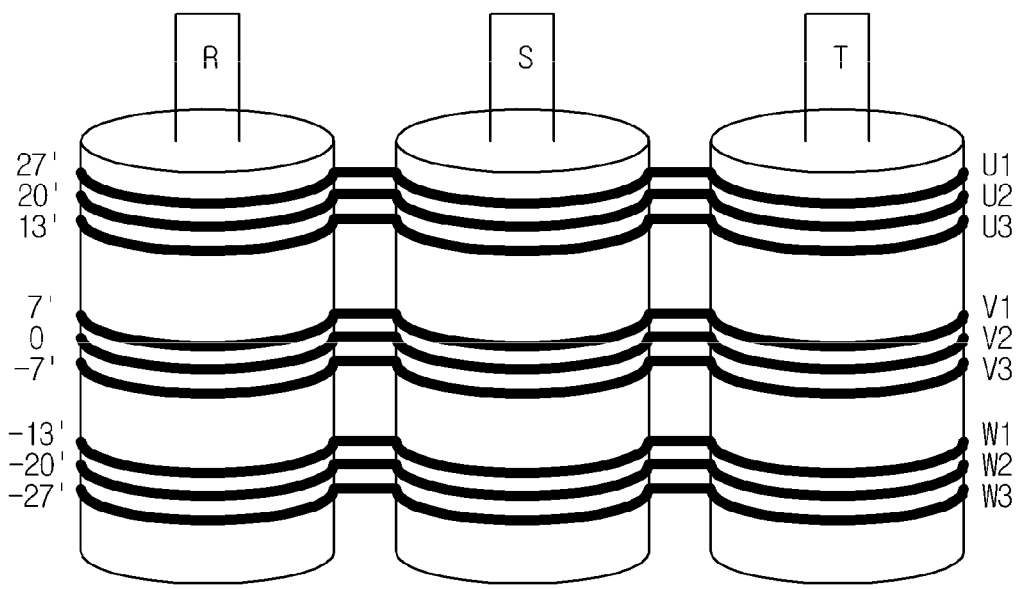
FIG. 5 is a schematic view illustrating a 3-phase 3-serial multi-winding transformer of a medium voltage inverter according to an exemplary embodiment of the present disclosure.

FIG. 5 is a schematic view illustrating a 3-phase 3-serial multi-winding transformer of a medium voltage inverter according to an exemplary embodiment of the present disclosure.

The degree of phase shifts owned by the multi-winding transformer of a cascaded H-bridge medium voltage inverter is determined by the number of unit power cells for each phase. The degree of phase shifts is determined by division of angles of −30°~+30° phase-shiftable by the transformer by the number of unit power cells for each phase, and phases of 3-serial multi-winding transformer are −20°, 0°, 20°, which is 60°/3, and when applied to the cascaded H-bridge medium voltage inverter, shows the same characteristic as that of a rectifier having a 18-pulse rectifying characteristic. The 3-phase 6-serial has a phase shift of −20°, −10°, 0°, 10°, 20°, 30° to exhibit a 36-pulse rectifying characteristic. The conventional multi-winding transformer has the number of phase shifts corresponding to that of unit power cells for each phase.

The multi-winding transformer in the cascaded H-bridge medium voltage inverter according to the exemplary embodiment of the present disclosure has a shape of a multi-winding transformer to have the number of phase shifts corresponding to that of entire unit power cell. Although the number of phase shifts in the 3-serial multi-winding transformer is three, which are −20°, 0°, 20° of 60°/3, the present disclosure has 9 phase shifts, and phase values are −27°, −20°, −13°, −7°, 0°, 7°, 13°, 20°, 27° in order to have a mutual difference of 60°/9, whereby a rectifying characteristic of total of 54 pulses is shown and the THD characteristic of input current is a 1~2% value.

The cascaded H-bridge medium voltage inverter rectifies the high voltage in each unit power cell for storage in DC voltage, and operates to convert the DC voltage to AC output through IGBT circuit of each unit power cell, where an input current has a pulse shape due to influence by a rectifying circuit.

The rectifying operation uses an AC voltage phase-shifted by the input end transformer such that the number of pulses for input current of each phase is 3 (constant)*2 (full-wave rectification circuit characteristic), which is the number of pulses at the time of 3-phase rectification at one unit power cell, and there will be a total of 18 pulses if the number of phase shifts is three. Although the number of pulses in input current is 18 if all 3 phases have the same phase as per the conventional method, and if the method proposed by the present disclosure is applied, the number of phase shifts in the input current is 9 to have 54 pulses of 3*2*9, whereby a current distortion phenomenon of a rectification circuit can be reduced.

As apparent from the foregoing, the present disclosure uses an input end multi-winding transformer in a new shape for reduction of THD in input current when a cascaded H-bridge medium voltage inverter is a 3-phase, 3-serial system.

The THD before input of the cascaded H-bridge medium voltage inverter is influenced by the number of phase shifts of input end multi-winding transformer, and the conventional multi-winding transformer has the same number of phase shifts as in the unit power cell for each phase.

The conventional input current THD characteristic can be reduced to a 1~2% level, if applied to 3000V, 3300V, 4150V cascaded H-bridge medium voltage multilevel inverter having a relatively smaller number of unit power cells by changing a shape of a multi-winding transformer in the cascaded H-bridge medium voltage inverter to allowing having the number of entire unit power cell from the number of unit power cells for each phase.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. A multilevel inverter, the multilevel inverter comprising:
a phase shift transformer configured to output a first voltage of predetermined phase by receiving AC input power having a fixed frequency;
a plurality of serially-connected unit power cells configured to output a second voltage having a predetermined phase by receiving the first voltage from the phase shift transformer; and
a master controller configured to exchange data with a unit power cell controller included in each of the plurality of serially-connected unit power cells,
wherein the phase shift transformer is configured to include a number of phase shifts corresponding to a number of the plurality of serially-connected unit power cells,
wherein an operation basic format for each of the plurality of serially-connected unit power cells is transmitted from the master controller to the corresponding unit power cell controller via optical communication, the operation basic format including an output voltage command and a synchronous signal, and
wherein information is transmitted from each unit power cell controller to the master controller, the information indicating at least an over-voltage, an under-voltage, an arm short-circuit, a ground, an open fuse, a heat sink overheat, abnormal hardware, an open phase of an output of the corresponding unit power cell or an open phase of an input of the corresponding unit power cell.

2. The inverter of claim 1, wherein:
the plurality of serially-connected unit power cells are configured such that three unit power cells for each phase are serially connected for 3-phase output; and
the phase shift transformer includes nine phase shifts, each phase shift value being a difference of 60°/9.

3. The inverter of claim 2, wherein the phase values are −27°, −20°, −13°, −7°, 0°, 7°, 13°, 20° and 27°.

4. The inverter of claim 1, wherein the second voltage is 3,000V, 3,300V or 4,150V.

5. The inverter of claim 1, wherein the plurality of serially-connected unit power cells are arranged as a cascaded H-bridge medium voltage multilevel inverter.

* * * * *